(12) United States Patent
Döll et al.

(10) Patent No.: US 6,264,010 B1
(45) Date of Patent: Jul. 24, 2001

(54) DISC BRAKE

(75) Inventors: Andreas Döll, Frankfurt; Hans-Georg Keferstein, Darmstadt; Holger Kranlich, Karben; Rudolf Thiel, Frankfurt; Jürgen Bauer, Weisbaden, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/230,836

(22) PCT Filed: Oct. 22, 1997

(86) PCT No.: PCT/EP97/05821

§ 371 Date: Jul. 19, 1999

§ 102(e) Date: Jul. 19, 1999

(87) PCT Pub. No.: WO98/19076

PCT Pub. Date: May 7, 1998

(30) Foreign Application Priority Data

Oct. 25, 1996 (DE) .............................................. 196 44 512

(51) Int. Cl.[7] .................................................. F16D 55/08
(52) U.S. Cl. ........................ 188/72.8; 188/71.9; 74/18.1; 277/549
(58) Field of Search ................................ 188/72.7, 72.6, 188/72.8, 71.9; 74/18, 18.1; 277/549, 550, 560, 561, 562, 564–569, 571

(56) References Cited

U.S. PATENT DOCUMENTS

| | | | |
|---|---|---|---|
| 3,885,653 | * 5/1975 | Farr | 188/71.9 |
| 4,031,985 | * 6/1977 | Ito | 188/71.9 |
| 4,184,571 | * 1/1980 | Karasudani | 188/72.7 |
| 4,185,838 | * 1/1980 | Danner | 277/562 |
| 4,256,207 | 3/1981 | Karasudani . | |
| 4,304,416 | 12/1981 | Oshima . | |
| 4,376,541 | * 3/1983 | Walter et al. | 277/353 |
| 4,544,045 | * 10/1985 | Runkle | 188/72.6 |
| 4,906,009 | * 3/1990 | Saitoh | 277/571 |
| 4,928,979 | * 5/1990 | Nagasawa | 277/348 |
| 5,060,765 | * 10/1991 | Meyer | 188/71.9 |
| 5,211,406 | * 5/1993 | Katzensteiner | 277/571 |
| 5,350,181 | * 9/1994 | Horve | 277/571 |
| 5,419,642 | * 5/1995 | McLarty | 384/486 |
| 5,431,413 | * 7/1995 | Hajzler | 277/571 |
| 5,529,150 | 6/1996 | Buckley et al. . | |
| 5,788,024 | * 8/1998 | Meyer | 188/72.7 |

FOREIGN PATENT DOCUMENTS

| | | |
|---|---|---|
| 18 95 910 | 3/1964 | (DE) . |
| 14 25 447 | 10/1968 | (DE) . |
| 20 04 501 | 8/1971 | (DE) . |
| 22 07 629 | 9/1972 | (DE) . |
| 26 29 654 | 1/1977 | (DE) . |
| 34 11 745 | 10/1985 | (DE) . |
| 34 38 209 | 4/1986 | (DE) . |
| 35 14 497 | 10/1986 | (DE) . |
| 06 49 993 | 4/1995 | (EP) . |
| 91 10841 | 7/1991 | (WO) . |

* cited by examiner

Primary Examiner—Robert J. Oberleitner
Assistant Examiner—Robert A. Siconolfi
(74) Attorney, Agent, or Firm—Rader, Fishman & Grauer PLLC

(57) ABSTRACT

The present invention relates to a disc brake with hydraulically operable brake pads and a mechanical actuating which includes an actuating shaft that is rotatably and sealedly mounted in a bore of a brake housing and acts upon at least one of the brake pads. The present invention focuses on that at least in the area of a shaft duct, a sealing element is provided which is fixed to the actuating shaft so as to rotate along with it and cooperates with at least one associated sealing element and/or mating sealing surfaces in a radial direction. The sealing element bridges a portion of the actuating shaft which is different from the shape of a circle.

15 Claims, 6 Drawing Sheets

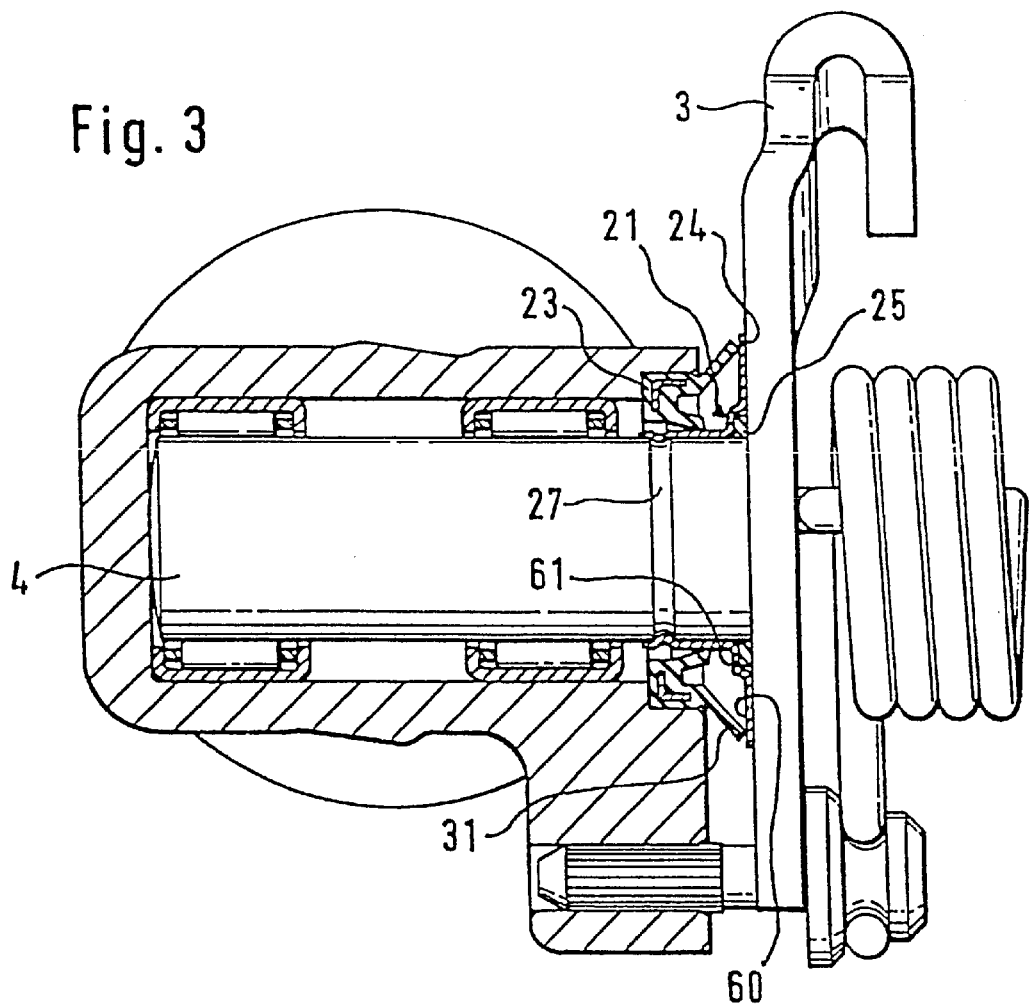

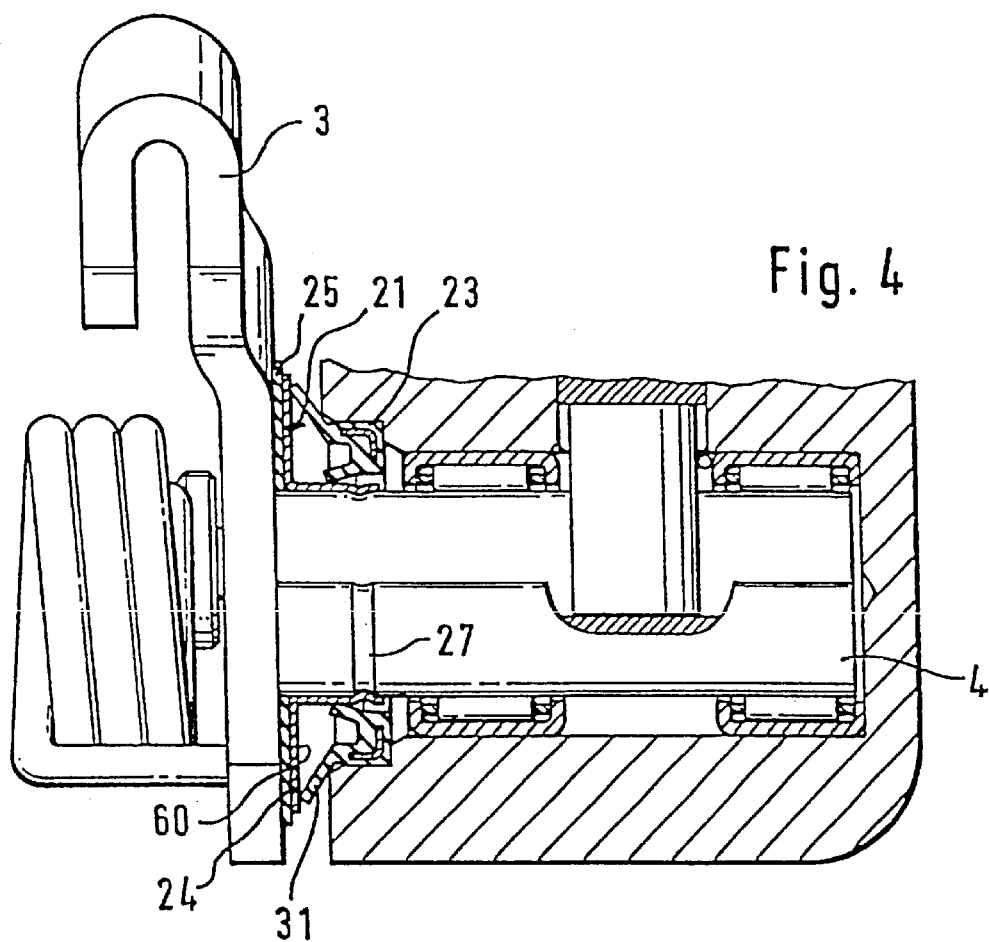

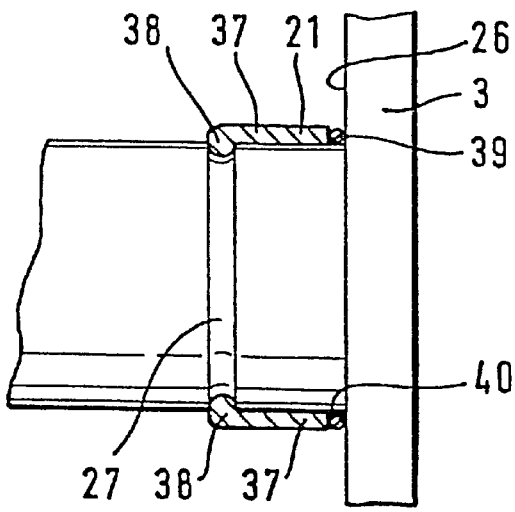
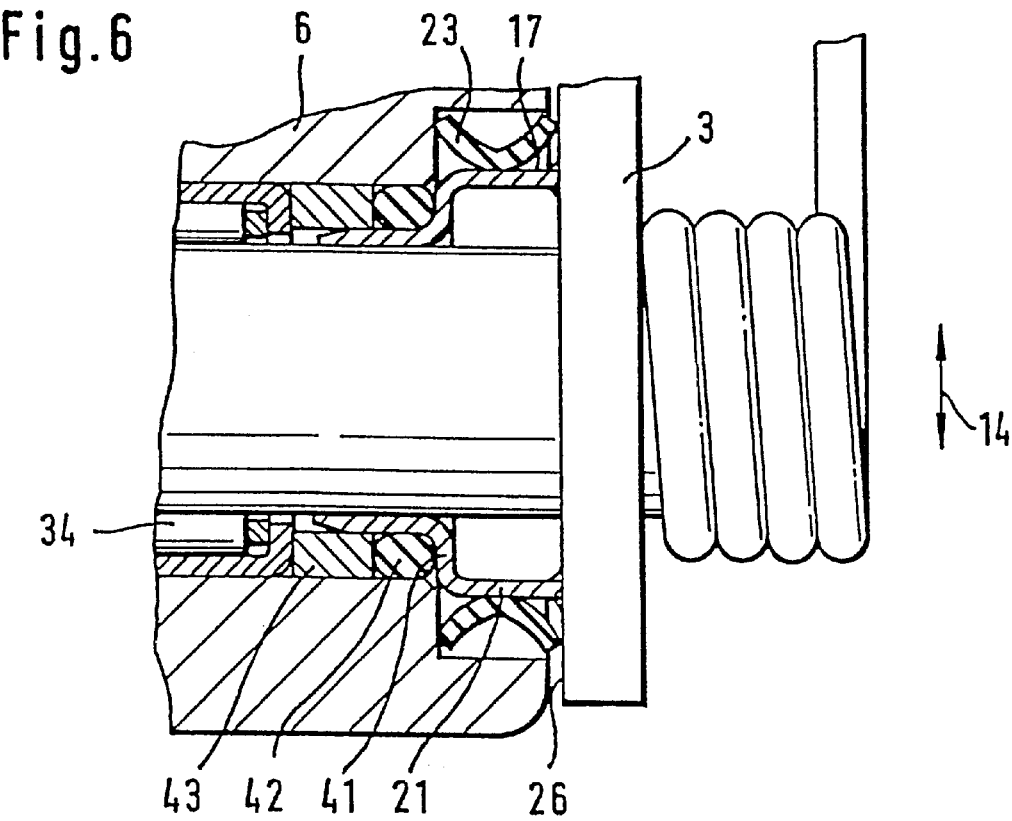

DISC BRAKE

TECHNICAL FIELD

The present invention relates to brake systems and more particularly relates to disk brake systems having integrated, mechanical actuating mechanisms.

BACKGROUND OF THE INVENTION

German patent application No. 34 38 209 discloses a disc brake of this type. The actuating shaft is cylindrically and rotatably mounted in a slide bearing, and a shaft sealing ring is placed in the area of a shaft duct which has a sealing lip that abuts on the periphery of the actuating shaft.

The manufacture of disc brakes of this type necessitates great effort and structure because the actuating shaft necessitates the provision of a cylindrical abutment surface in the area of the shaft sealing ring, on the one hand. On the other hand, a recess must be provided in the area of a pressure member, which is principally carried out by metal-cutting processes. In general, profile bars are meanwhile employed as actuating shafts having a recess which extends over the total overall length of the actuating shaft. This eliminates at least the need to manufacture the recess. However, no satisfactory solution has been found until now for sealing the mounting support of such actuating shafts against the ingress of dirt and moisture from outside. This frequently results in actuating shafts stuck with corrosion and, hence, defective disc brakes.

Therefore, an object of the present invention is to provide a reliable and also inexpensive sealing of the mounting support of profiled actuating shafts which permits reliable functioning over the total useful life of the disc brakes and, in addition, and minimizes losses due to friction.

This object is achieved by the brake system of the present invention wherein, in the area of a shaft duct, a sealing element is provided which is fixed to the actuating shaft so as to rotate along with it and cooperates with associated sealing elements and/or sealing surfaces in a radial direction. Another advantage is achieved because the sealing element that is movable along with the actuating shaft cooperates with an associated supplementary sealing element and/or an associated sealing surface also in an axial direction.

The present invention contemplates the combination of profiled actuating shafts with conventional and customary sealing elements or, respectively, with easy-to-make sealing surfaces. This minimizes the necessary costs.

Costs may be reduced even further by configuring the sealing element as a bushing, which can be manufactured of sheet metal or plastics material by way of deepdrawing processes, for example. A bushing provided as a snap-in element can be fitted to the actuating shaft easily and at low cost.

A functional advantage related to sealings can be achieved by forming a collar to the bushing on the side of the shaft end. Additionally, the collar includes a sealing surface for the axial abutment of a sealing element.

The sealing element has a disc-shaped configuration and includes radially outside and axial sealing lips which serve to abut on mating sealing surfaces. This produces together with axial sealing lips a prechamber in front of the radial seal which additionally improves the sealing effect of the sealing element.

In a preferred aspect of the present invention, the sealing element includes at least one recess into which a carrier element of the actuating lever is engaged. This achieves an improved connection of the sealing element to the shaft for rotation therewith.

BRIEF DESCRIPTION OF THE DRAWINGS

FIG. 3 is a cross-sectional view of a further development of a sealing arrangement of the mechanical actuating mechanism.

FIG. 4 is a cross-sectional view of another variation of the sealing arrangement.

FIG. 5 shows details of a modified embodiment in a view like in FIG. 2.

FIG. 6 is still another modified embodiment of the present invention.

DETAILED DESCRIPTION OF THE PREFERRED EMBODIMENTS

Figure 1:
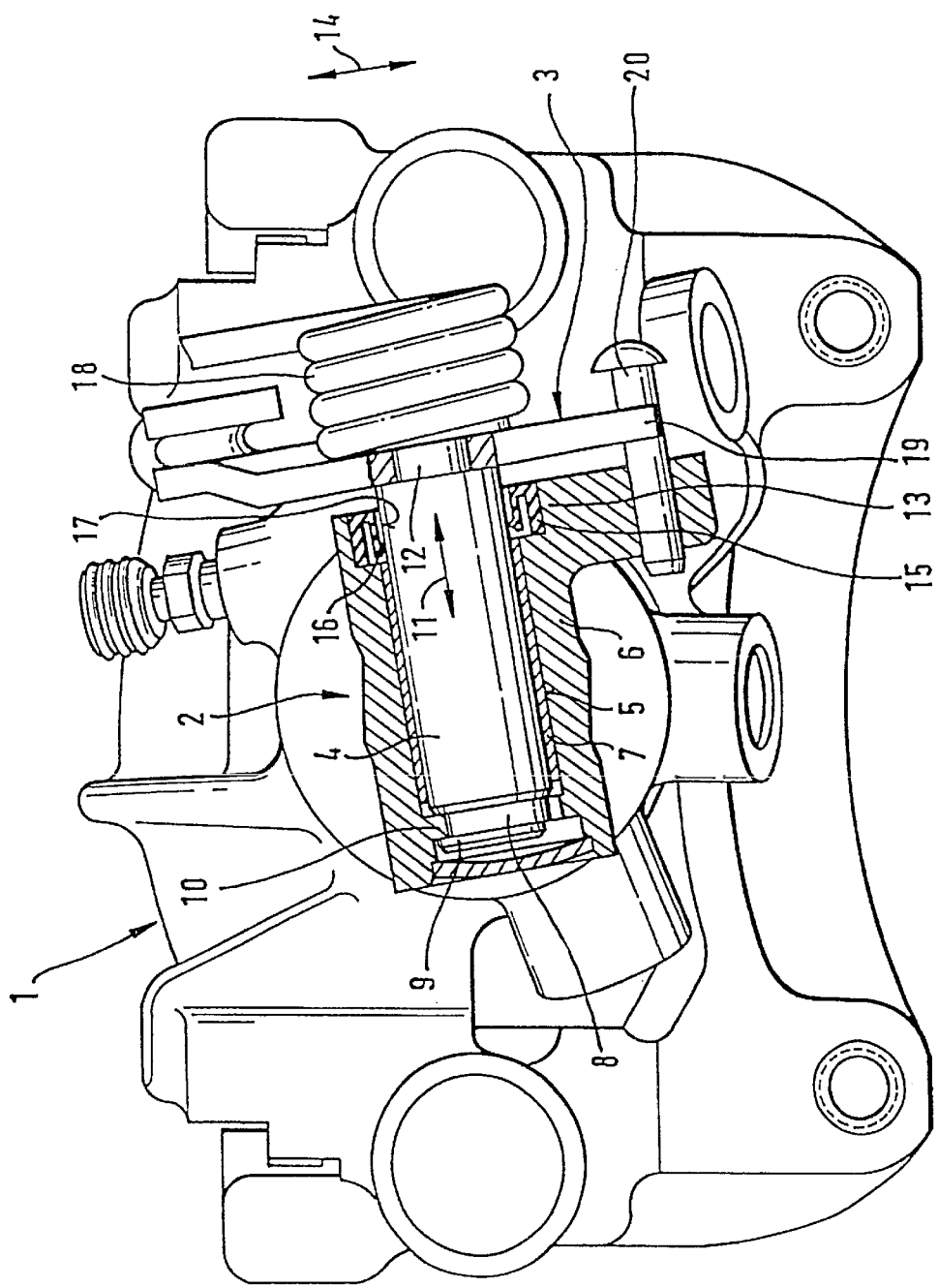
FIG. 1 is a cross-sectional view of a mechanical actuating mechanism of a disc brake according to the state of the art.

FIG. 1 shows a partial cross-sectional view of a disc brake 1 with a mechanical actuating mechanism 2 for hydraulically operable brake pads (not shown). The mechanical actuating mechanism 2 includes an actuating lever 3 and an actuating shaft 4 which is unrotatably connected to lever 3 and is in operative connection to a non-illustrated pressure member. The actuating shaft 4 is rotatably mounted in a bore 5 of the brake housing 6 within a slide bearing 7 and has, at least in part, a cross-section different from the shape of a circle. Provided at end 8 of the actuating shaft 4 is a collar 9 which serves to abut on an intermediate wall 10 and secures the actuating shaft 4 in position in the brake housing 6 in an axial direction 11. The other end 12 of the actuating shaft 4 extends out of the brake housing 6 in the area of a shaft duct 13. In a radial direction 14 with respect to the actuating shaft 4, a shaft sealing ring 15 is installed which protects the slide bearing 7 against the ingress of dirt and moisture from the outside. A sealing lip 16 of the shaft sealing ring 15 which is unrotatably mounted in the brake housing 6 bears against the circumference 17 of the actuating shaft 4. Assisted by a spring 18, the actuating lever 3 with the shaft 4 is constantly urged into an end position where the actuating lever 3 with an arm 19 moves to abut a pin 20.

Figure 2:
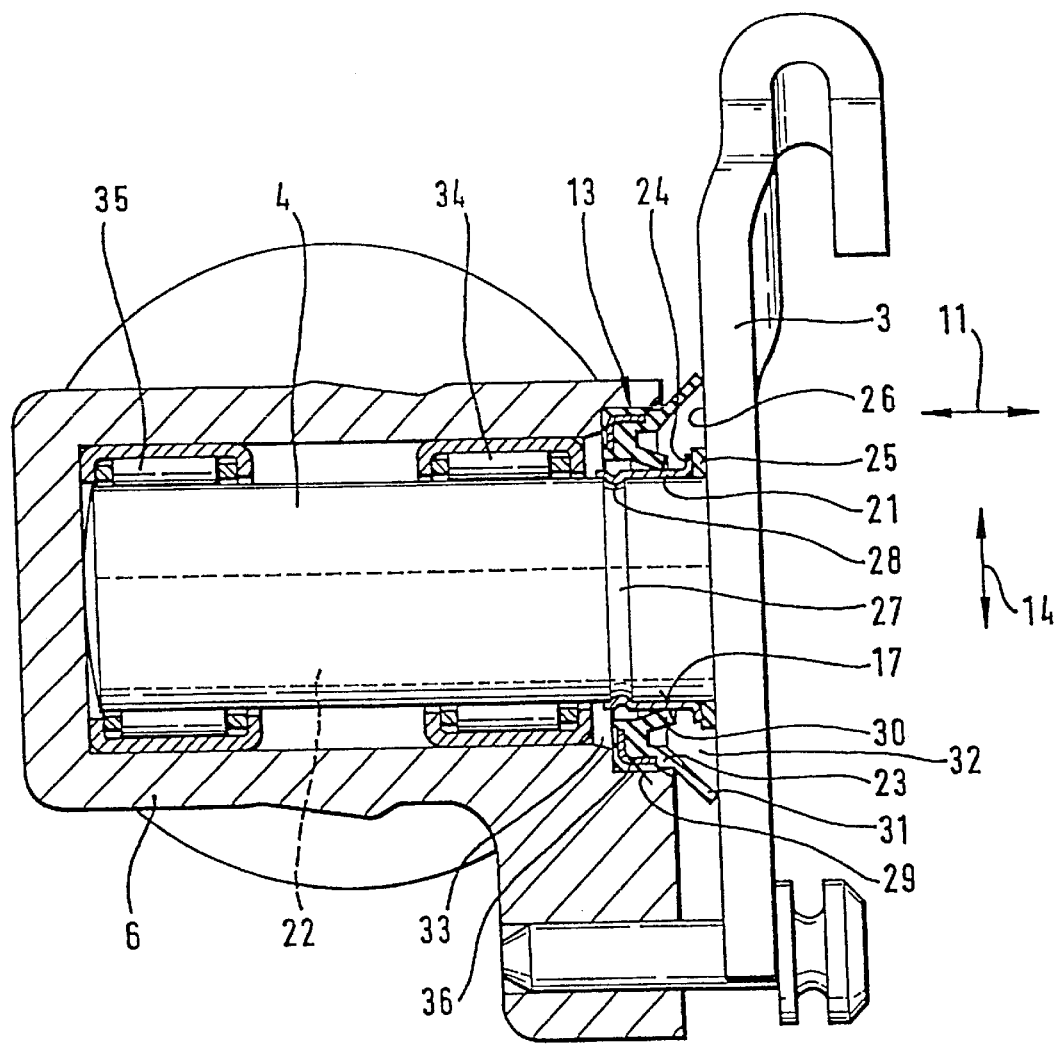
FIG. 2 is a cross-sectional view of a sealing arrangement of a mechanical actuating mechanism according to the present invention in a view like in FIG. 1.

According to the present invention, as is shown in FIG. 2, a sealing element 21 in the form of a bushing is associated with the actuating shaft 4 and adapted to rotate with it. Element 21 extends over a recess 22 of the actuating shaft 4 at least in part. Thus, the bushing ensures a circular circumference 17 in the area of the shaft duct 13 which cooperates in a radial direction 14 with an associated sealing element 23 in the form of a sealing ring. On the end close to the lever, the bushing includes a collar 24 which bears against a mating sealing surface 26 of the actuating lever 3, and a packing washer 25 is interposed there between. It should be noted that collar 24 and packing washer 25 are not absolutely necessary when the sealing element 21 is attached to the mating sealing surface 26 in a directly sealing fashion. On its other end, the bushing is positively engaged into a groove 27 which is arranged on the circumference of the actuating shaft 4. To this end, at least one projection 28 is provided on the bushing which extends radially inwardly and ensures an attachment of the bushing to the actuating shaft 4 for rotation therewith. In addition, each projection 28 ensures that the bushing is axially secured in position with respect to the actuating shaft 4. Of course, other types of attachment of the bushing to the actuating shaft 4 may also be provided. The type of attachment depends especially on which material is chosen for the bushing. For example, bushings made of sheet metal can be caulked, cemented or soldered to the actuating shaft 4. It is also possible to solder or cement the bushing directly to the mating sealing surface 26 of the actuating lever 3 so that the groove 27 becomes unnecessary. Such a solution is shown in FIG. 6. Further, combinations of the above-mentioned possibilities are appropriate which ensure an increased reliability in operation due to improved sealing or fastening arrangements.

Besides, the embodiment of FIG. 2 shows that the sealing element 23 is arranged in a bore 29 of the brake housing 6 formed fast with the housing. The sealing element 23 has a first sealing lip 30 which elastically abuts on the circumference 17 of the sealing element 21 in a radial direction 14, and a second sealing lip 31 which elastically abuts on the mating sealing surface 26 of the actuating lever 3 in an axial direction 11. This produces a chamber 32 between the first and second sealing lips 30, 31 which isolates the inside space 33 from gross contaminants. Especially the second sealing lip 31 protects the roller bearings 34, 35 against small-size contaminants and moisture. The advantage of the roller bearings 34, 35 is that they involve low losses due to friction, on the one hand, and that they are insensitive to corrosion, on the other hand. Principally, however, slide bearings may also be used without departing from the basic idea of the present invention. Moreover, it is self-explanatory that the sealing element 23 according to the present invention may have any desired configuration, for example, with a reinforcing ring 36 shaped in it.

The embodiments of FIGS. 3 and 4 are improvements of the sealing arrangement for a mechanical actuating mechanism corresponding to FIG. 2. Especially the sealing element 21 configured as a bushing has a design different from the one in FIG. 2. Exactly as in the variation described hereinabove, the bushing 21 at one end is positively engaged in a groove 27 of the actuating shaft 4 and is thereby reliably retained thereon. To improve the sealing effect, the bushing 21 has a deflected collar 24 at its end close to the shaft end. Advantageously, collar 24 has such a radial extension that it provides a sealing surface 60. A sealing lip 31 of the sealing element 23 bears axially against the sealing surface 60. It is preferred that the bushing 21 is made of stainless steel, and the collar 24 is produced by sheet-metal shaping, for example, in a punching operation. Similarly, the bushing may of course also be made of any other suitable material, such as plastics. Due to the appropriate material selection for the bushing, especially when it is made of stainless steel, the desired surface quality of the sealing surface 60 is achieved. The result is a particularly effective sealing joint between the bushing 21 and the sealing lip 31. To ensure a sealing between the bushing and the actuating lever 3, an additional packing washer 25 is enclosed between the collar 24 and the actuating lever. This additional provision prevents the ingress of dirt between the bushing and the actuating lever 3. According to FIG. 3, the annular packing washer 25 can be safely positioned by a step 61 in the bushing and pressed against the actuating lever with the pressure needed.

In the sealing arrangement according to FIG. 4, the packing washer 25 has a larger extension in a radial direction and is interposed axially under preload between the bushing 21 and the actuating lever 3. This eliminates the need for the step 61 on the bushing shown in FIG. 3, and the result is a simplified bushing design. Similarly to the arrangements described hereinabove, the collar 24 of the bushing is extended in a radial direction so far that it provides a sealing surface 60 for the axial abutment of the associated sealing lip 31.

FIG. 5 shows a design wherein the sealing element 21 has the shape of a bushing and engages into groove 27 with fingers 38 arranged on the end of resilient arms 37. On the end close to the lever 3, an O-ring 39 is interposed between the sealing element 21 and the mating sealing surface 26. Its purpose is to seal a gap 40 between the actuating shaft 4 and the sealing element 21. The sealing element 21 is squeezed virtually elastically between the mating sealing surface 26 and the groove 27 by way of the elastic O-ring 39. The sealing element 21 may thus be provided as a plastics component and, with locking engagement in groove 27, slipped onto the actuating shaft 4. This arrangement achieves advantages in terms of assembly.

According to FIG. 6, the bushing-shaped sealing element 21 is soldered or cemented to the mating sealing surface 26 of the actuating lever and further has a step 41 used to press an O-ring 42 against a roller bearing 34, with a spacer ring 43 interposed. A sealing element 23 having a V-shaped cross-section bears against the circumference 17 of the sealing element 21 in a radial direction 14. Sealing lips are provided on each leg of the sealing element 23 and bear against the mating sealing surface 26 respectively against the brake housing 6. The sealing element 23 is generally used as a primary seal, while the O-ring 42 has the purpose of a main seal. It is principally possible to design the primary seal and the main seal integrally by shaping the O-ring 42 acting as a main seal directly to the primary seal.

Figure 8:
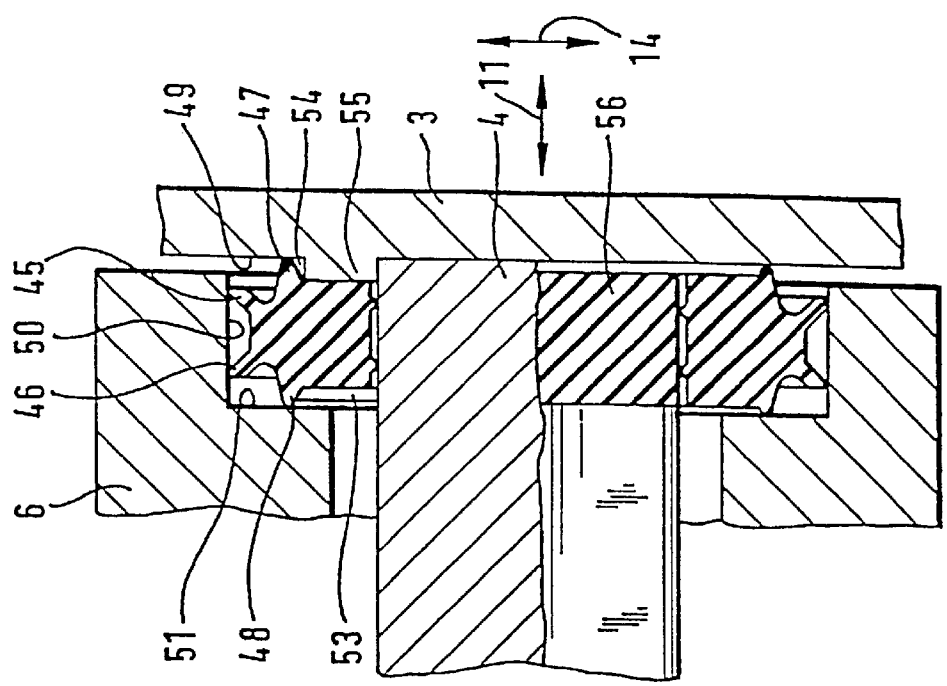
FIG. 8 is a cross-section through a disc-shaped sealing element taken along the line VI—VI in FIG. 7.
Figure 7:
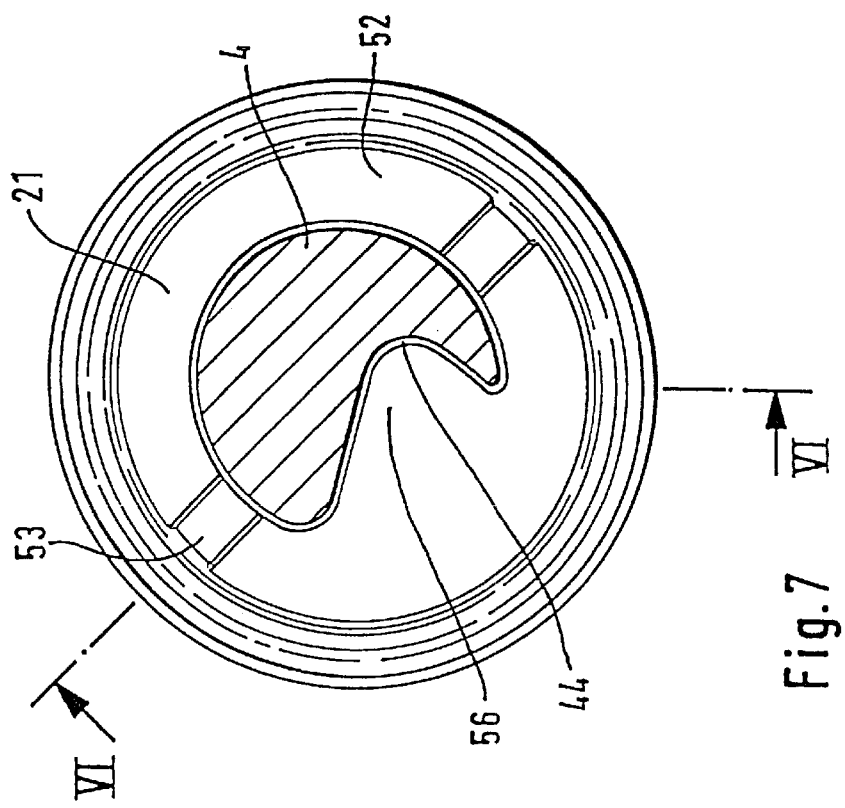
FIG. 7 is a view of a disc-shaped sealing element.

The embodiment of FIG. 7 depicts a disc-shaped sealing element 21 which is slipped on a profiled actuating shaft 4. The sealing element 21 is arranged on the actuating shaft 4 in positive engagement therewith because the projection 56 is engaged in the recess 44. Recess 44 cooperates with a pressure member (not shown). The embodiment of FIG. 8 shows in a cross-sectional view a sealing element 21 arranged in a brake housing 6 and attached to an actuating shaft 4. The sealing element 21 includes two radially external sealing lips 45, 46 and two axial sealing lips 47, 48. The sealing lips 45, 46, 47, 48 are adapted for abutment on associated mating sealing surfaces 49, 50, 51 which are arranged on the actuating lever 3 or the brake housing 6. Thus, the sealing element 21 provides a sealing both in an axial direction 11 and a radial direction 14. Recesses 53, 54 for engagement by cam-shaped carrier elements 55 of the actuating lever 3 are provided on each end surface 52. This achieves an unrotatable connection of the sealing element 21 and the actuating shaft 4, and prevents the sealing element 21, which is preferably made of an elastic material such as EPDM, for example, from being deformed in the area of the recess 44 to an unacceptable degree.

It should be noted that many variations of the sealing element 21 are possible without departing from the basic idea of the present invention.

What is claimed is:

1. Disc brake with hydraulically operable brake pads, comprising:
   a brake housing,
   a mechanical actuating mechanism including an actuating shaft that is rotatably and sealedly mounted in a bore of the brake housing and acts upon at least one of the brake pads, a sealing element which is fixed to the actuating shaft such that said sealing element rotates with said shaft, whereby said sealing element cooperates with associated sealing elements or sealing surfaces in a radial direction, wherein the actuating shaft has a cross-section which differs at least in part from the shape of a circle radially inward of said sealing element.

2. Disc brake as claimed in claim 1, wherein the sealing element which is fixed to the actuating shaft so as to rotate along with it, cooperates with associated sealing elements or sealing surfaces in an axial direction.

3. Disc brake as claimed in claim 1, wherein the sealing element extends at least in part over a recess in the actuating shaft.

4. Disc brake as claimed in claim 1, wherein the sealing element bears against a mating sealing surface in an axial direction close to the shaft end.

5. Disc brake as claimed in claim 1, wherein the sealing element bears against an actuating lever close to the shaft end.

6. Disc brake as claimed in claim 1, wherein the sealing element is configured as a bushing.

7. Disc brake as claimed in claim 1, further including an additional sealing element disposed between a mating sealing surface and the sealing element.

8. Disc brake as claimed in claim 1, wherein a bushing includes a collar close to the shaft end.

9. Disc brake as claimed in claim 8, wherein the sealing element cooperates with the collar close to the shaft end in an axial direction.

10. Disc brake as claimed in claim 1, wherein the actuating shaft includes a groove on the circumference into which the sealing element is positively engaged.

11. Disc brake as claimed in claim 1, wherein the sealing element includes resilient arms and fingers which engage into a groove.

12. Disc brake as claimed in claim 1, wherein the sealing element has a disc-shaped configuration and includes radially outside sealing lips for abutment on a mating sealing surface.

13. Disc brake as claimed in claim 1, wherein the sealing element includes axial sealing lips for abutment on mating sealing surfaces.

14. Disc brake as claimed in claim 1, wherein the sealing element with a projection is positively engaged in a recess of the actuating shaft.

15. Disc brake as claimed in claim 1, wherein the sealing element includes at least one recess into which a carrier element of the actuating lever is engaged.

* * * * *